Figure 1:
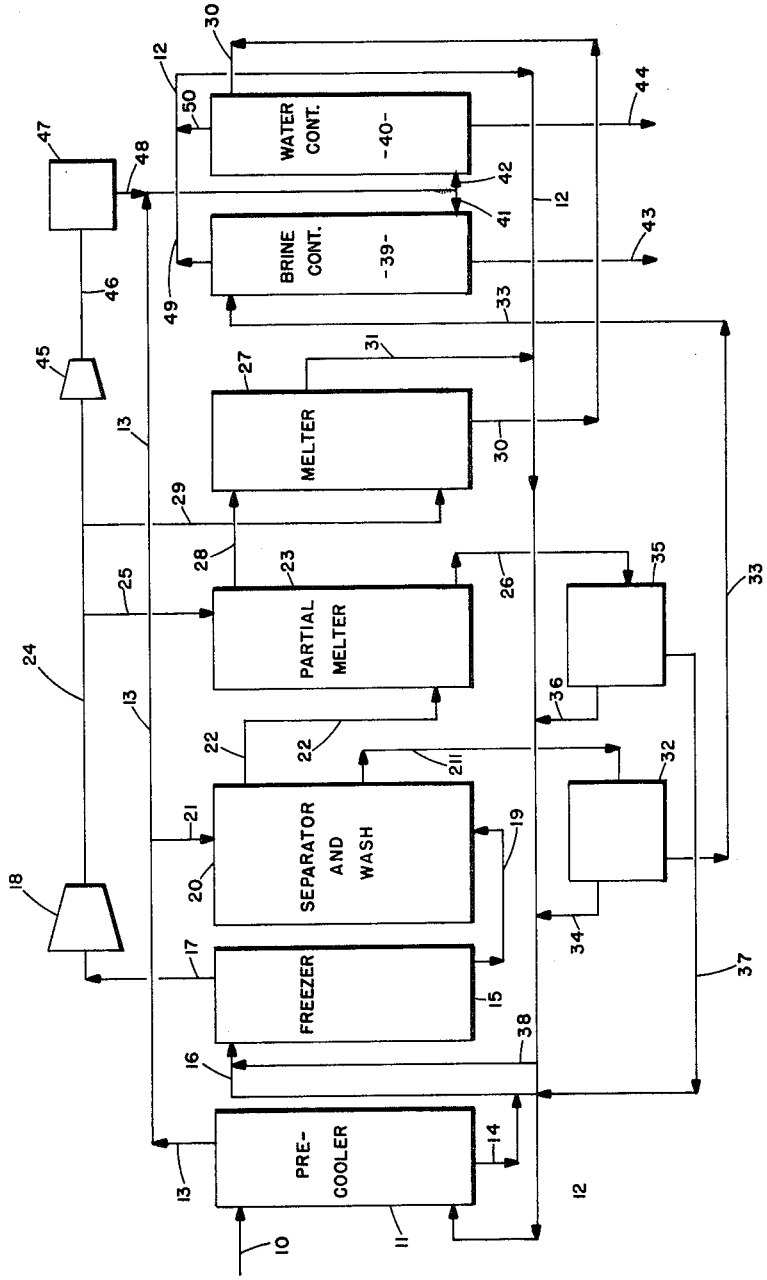

INVENTORS
LUDWIG ROSENSTEIN
MANUEL H. GORIN
BY
ATTORNEY

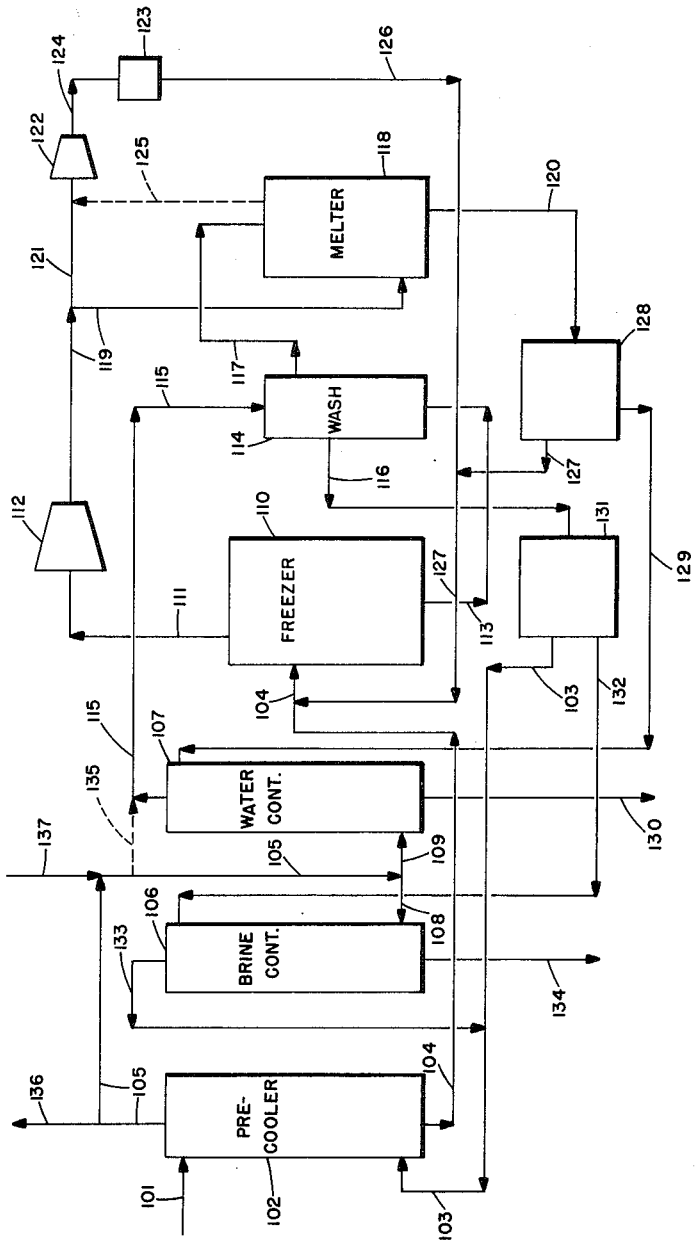

United States Patent Office 3,205,671
Patented Sept. 14, 1965

3,205,671
CONCENTRATION BY SOLID FORMATION
Ludwig Rosenstein, 2010 Lyon St., San Francisco, Calif., and Manuel H. Gorin, 57 Corte Ramon, San Rafael, Calif.
Filed July 3, 1961, Ser. No. 121,484
2 Claims. (Cl. 62—58)

This invention relates to a process for removing solvent from solutions. In one embodiment, the process relates to the de-salination of sea water by concentration, and recovery of water having a relatively low salt concentration. This application is a continuation-in-part of our co-pending application, Serial No. 668,284, filed June 25, 1957, U.S. Patent No. 3,098,733 and entitled, Removal of Water from Aqueous Solutions and Recovery of Fresh Water.

It has been proposed to obtain potable water and concentrated salt solution from sea water and brackish water by a process which involves freezing the sea water into ice which is relatively free of dissolved salts, which ice is removed from the sea water and melted to give potable water. One method of obtaining less concentrated salt solutions from sea water by freezing involves freezing the sea water in direct contact with a volatile liquid refrigerant. In order to operate the process with a minimum energy input, the refrigerant gas produced in freezing the water is compressed and contacted with the ice (after separation from the brine) to condense and cool the refrigerant for reuse in the freezing operation.

To improve the economics of this process it has been suggested that the incoming sea water to be purified be precooled to near its freezing point prior to being frozen in direct contact with the refrigerant.

One serious problem encountered in developing the freezing process has been the lack of an effective method of separating occluded brine from the ice crystals produced without a large loss of energy. In the freezing step where the refrigerant vapor is produced to freeze a part of the water, temperatures substantially lower than the freezing point of pure water are encountered. Thus, in the washing and melting of the ice to produce fresh water considerable "cold" may be lost to the system due to the need to first raise the ice to melting temperature and then supply the heat of fusion. Thus, energy is lost in the process if the ice is washed with water after partial separation from the residual brine.

It is, therefore, an object of this invention to provide an improved process for the separation of components of solutions by partially freezing the component by direct contact with a vaporizable liquid refrigerant. Another object of this invention is to provide a process for effectively separating a portion of solvent from a solution. A further object of this invention is to provide an improved process for obtaining fresh water from aqueous solutions, particularly sea water and brackish water. A still further object is the provision of a process useful in the art of dehydration by freezing.

In the drawings accompanying this specification,

FIG. 1 is a schematic diagram of an embodiment of this invention in which sea water is treated and which employs a volatile refrigerant to freeze, melt, cool, and heat exchange; and FIG. 2 illustrates an embodiment of this invention wherein a supplemental heat transfer liquid is employed.

The objects of this invention are accomplished by providing a process for separating less concentrated solution from a relatively more concentrated solution which includes the steps of forming solids in a solution of intermediate concentration by direct contact with a vaporizable liquid refrigerant, separating the solids from residual solution, contacting the solids with an immiscible heat exchange fluid, and subsequently forming a liquid from the solids by contacting the solids with compressed refrigerant vapors.

The process of this invention is applicable to systems wherein a component of a solution is separated from the solution by the formation of solids and residual solution by transferring energy from the solution. Thus, the recovery of relatively demineralized water from aqueous solutions such as sea water by partial freezing or by refrigerant hydrate formation, or both, may be effected by the process of this invention. The practice of this invention is applicable whether the solvent, the concentrate, or both, be considered the desired products. The invention, therefore, is applicable to a process for preparing frozen concentrates such as orange juice, concentrated coffee, and beer and wine concentrates. In addition, the application of freezing or solid formation may be employed as a step in the preparation of dehydrated products. Similarly, the process has application to methods for recovering essentially all the solvent from the solution to prepare a solid product.

A preferred embodiment of the invention relates to the recovery of fresh water from saline solutions such as sea water, brackish waters, or other unpotable water containing dissolved material such as inorganic salts.

A particularly preferred embodiment is the recovery of water of lowered salt concentration from sea water by partial freezing. In such a process, the incoming sea water is precooled to near its freezing point by one of several methods. The precooling may be accomplished by conventional indirect heat exchange with a cooling medium. However, it is preferred to accomplish cooling by direct contact with a heat exchange medium which may be the same fluid as is employed as a refrigerant. In a particularly preferred embodiment of this invention, the heat transfer medium has a high solubility for and is different from the particular refrigerant employed. For best results, all direct contact heat exchange is performed by countercurrent flow of the liquids being heat exchanged. After precooling, the sea water is partially frozen in direct contact with the vaporizable liquid refrigerant, thus forming refrigerant vapors, ice, and residual brine.

To remove residual concentrated brine adhering to the ice crystal, the present invention provides that the ice be contacted with an immiscible heat transfer fluid to wash the brine from the ice. This may be accomplished in several ways; for example, by treating the ice with a small amount of refrigerant vapor prior to the final melting operation, by fractionally melting the ice with compressed refrigerant in two or more separate vessels, by contacting the ice with liquid refrigerant, or by contacting the ice with supplemental heat transfer liquid. If desired, an alternative or an additional wash with relatively pure water may be provided to further remove occluded brine from the ice. In order to conserve material and energy in the system, the water washings may be recirculated to the freezing operation. The refrigerant vapor produced in forming ice is compressed and employed in melting the ice to produce the desired fresh water product.

As noted in application, Serial No. 668,284, now U.S. Patent 3,098,733, the ice produced by freezing the water of a saline is not pure. It occludes residual brine in varying amounts depending on the extent and technique of freezing. Where 50 percent of the water is recovered, this may be 3000 to 5000 parts per million. However, when such ice melts, the first portion to melt carries with it the larger portion of the occluded salt. Therefore, the melting device may be a number of such vessels in which fractionation by melting takes place. When 50 percent of the water is frozen out of sea water, the melting of 5–15 percent of the ice will carry away enough salts to leave the remaining ice usable. The water produced by the first melting may be used for some other purpose or it may be purified by other means such as distillation, deionization, etc. Since it contains less total solids than sea water, and will be cold, it may also be returned to the freezer.

The product water resulting from the melting process and residual brine from the freezing process are both at significantly lower temperatures than the fed and may be used to cool the heat transfer medium so that it may be reused to cool additional incoming sea water. This may be accomplished by conventional indirect contact of the brine or water, or both, with the heat transfer medium. Preferably it may be accomplished by direct contact of brine and water with refrigerant when the refrigerant is employed as the initial heat transfer medium or the supplemental heat transfer liquid, if one is employed, to precool the incoming sea water.

Although the above illustration has been given with respect to the recovery of water from sea water, the process of this invention is equally applicable to the purification and concentration of other solutions not only by freezing to recover solvent, but also to recover solute, and by hydrate formation to concentrate the solution.

When water is removed from the sea water by hydrate formation, the vaporizing refrigerant forms a hydrate in the freezing step and this hydrate is later decomposed by the refrigerant vapors.

In the operation of the freezer atmospheric pressure, sub-atmospheric pressure, or super-atmospheric pressure may be employed, depending upon the volatility of the particular refrigerant used. It is preferred to pre-mix refrigerant and precooled sea water and inject the mixture into the freezing vessel to cause flash evaporation of the refrigerant. The refrigerant vapor is then withdrawn and compressed in a subsequent step in the process for use in melting the ice formed, and the ice-brine mixture is separated by physical means.

The accompanying drawings are intended only as a schematic representation of the process, and thus miscellaneous pumps, valves, control units, and several optional cooling and process stream operations have not been illustrated.

With specific reference to the accompanying drawings, FIG. 1 illustrates an embodiment of this invention for recovering demineralized water from sea water. Unprocessed sea water from storage or other convenient source may first be deaerated in a suitable device to remove, as far as economically practical, dissolved components of air, such as oxygen, nitrogen, and carbon dioxide. It is not necessary to employ a deaerator as provision may be made in a subsequent portion of the process for removing dissolved inert gases. Sea water from the deaerator or storage passes through line 10 and enters the precooler 11 where it is cooled in direct countercurrent contact with a cold stream of refrigerant liquid, such as butane. Butane liquid enters the precooler 11 at about 32° F. through line 12 and leaves through line 13. The cooled sea water leaves the precooler 11 through line 14 to be mixed with cold liquid butane in line 16 and enters the freezer 15. In the freezer 15 the liquid butane evaporates and causes partial freezing of the cooled sea water. The liquid butane enters the freezer 15 preferably below the freezing point of sea water. The vaporized butane exits via line 17 to the compressor 18. The temperature and quantity of butane employed in the freezer 15 are adjusted so that approximately one-half the sea water is frozen. The residual brine and ice are taken as a slurry from the freezer 15 through line 19 into the bottom of the vessel 20. A pump may be employed in the line 19, if necessary. Ice-brine slurry rises in the vessel 20 and brine is removed through line 211, thus forming a bed of ice crystal in the upper portion of the vessel. Since the ice bed contains occluded brine and is at a temperature substantially below 32° F., it is desirable to both remove the brine and raise the ice temperature to approximately 32° F. prior to melting all the ice. To help accomplish this, warm liquid butane flowing through line 13 is diverted into line 21 and enters the vessel 20 at the top and is distributed over the ice bed. The liquid butane moves down through the ice bed and causes some melting of the ice crystal. The resulting water and liquid butane effectively wash a substantial portion of the occluded brine from the ice and liquid butane is cooled to the temperature of the ice bed. In this way not only is the ice purified, but a substantial amount of the surplus cold in the ice bed is recovered. The amount of liquid butane used in washing the ice and aiding in the separation of ice and brine is adjusted so that the temperature at the top of the vessel 20 never exceeds 32° F. and is preferably adjusted so that a 32° F. temperature exists at the upper part of the vessel 20. The liquid butane and removed occluded brine leave the vessel 20 along with residual brine via line 211. The upper portion of the ice bed in vessel 20 is constantly removed via line 22 to vessel 23. In the vessel 23, in order to further remove occluded brine from the ice crystal, a portion of the butane vapor produced in the freezer 15, which has been compressed in the primary compressor 18, is contacted with the ice. The butane vapor, which has been formed as a result of compression, flows through lines 24 and 25 and is admitted near the top of vessel 23. In partially melting the ice, the warm compressed butane vapor is condensed to a liquid and this liquid butane, along with any water produced in the vessel 23, exits via line 26. The remaining purified ice crystal is taken from the vessel 23 to the melter 27 through line 28. In order to aid the transport of ice in line 28, the ice may be slurried in product water. The greatest portion of the compressed refrigerant vapor flowing through line 24 is admitted to the melter 27 via line 29. This butane vapor is passed upward through the ice in the melter 27 and condenses to a liquid while melting the ice to product water. The actual flow of butane in the melter 27 is adjusted to melt all the incoming ice. Product water is drained from the melter 27 through line 30, while liquid butane is removed from the vessel through line 31. To prevent vapor leakage in lines 30 and 31 appropriate traps may be provided.

The product water produced by this sequence of washing and partial melting is considerably purer than water produced by draining brine from the original ice slurry and melting. Furthermore, the process illustrated has a much lower power consumption than a similar process using a water wash in the vessel 20.

The residual brine and liquid butane leaving the vessel 20 via line 211 are conducted to a separating vessel 32. Here the two liquids are separated by virtue of their densities and immiscibility. The residual brine is taken from the bottom of vessel 32 through line 33 while the cold liquid butane leaves from near the top of vessel 32 via line 34. Similarly, the water and liquid butane leaving the vessel 23 via line 26 are conducted to the separator 35, from which butane is withdrawn through line 36 and the water is withdrawn through line 37. Since the water in line 37 has a much lower salt content than the residual brine, it may be remixed with precooled sea water and recycled to the freezing operation. The liquid butane in lines 34 and 36 is readmitted to line 12 for use in the precooler and the freezer (via line 38). In order to provide a continuous stream of cold butane for continuously cooling unprocessed sea water, the product water flowing through line 30 and the residual brine flowing through line 33 are heat exchanged by direct countercurrent contact with the warmed liquid butane flowing through line 13. This is accomplished in the brine contactor 39 and the product water contactor 40. All of the warm butane not used in the vessel 20 is admitted to the brine contactor 39 and product water contactor 40 through lines 41 and 42, respectively. Since the butane has a lower density than either product water or residual brine, it is admitted at the bottom of the contactors 39 and 40. Re-cooled butane leaves the contactors 39 and 40 through lines 49 and 50 and is recombined in line 12 for reuse in the freezing vessel 20 and the precooler 11. Residual brine enters at the top of contactor 39 through line 33, while product water enters at the top of contactor 40 through line 30. Warmed residual brine leaves the contactor 39 through line 43 for disposal or further processing, while product water leaves via line 44 for storage, use, or further processing.

Since there will be an excess of heat in the compressed refrigerant vapors flowing through line 24 over and above that needed to melt all the ice produced in the process, some of the butane vapor is further compressed in the secondary compressor 45 and taken through line 46 to the condenser 47. Residual brine, product water, unprocessed sea water or other cooling medium may be employed in the condenser 47. The warm liquid butane resulting from the condensation in the condenser 47 is taken through line 48 and combined with warm liquid butane in line 13 for cooling in the contactors 39 and 40.

In the process described in FIG. 1, the vessel 20 may be omitted and the separation of residual brine and ice may take place in the vessel 23. When this is done, it may be desirable that the fractional melting of ice to remove occluded brine by condensing a portion of the butane vapor take place in more than one vessel.

Olternatively, the vessel 23 may be omitted in the process and sufficient ice can then be melted in the separator vessel 20 to remove occluded residual brine. In this instance, it may be desirable to provide an additional fresh water wash prior to the total melting of the ice crystals in the melter 27.

In the process illustrated in FIG. 2, sea water enters the precooler 102 through line 101 to be cooled to near its freezing point in direct contact with cold octane entering through line 103. Thus cooled sea water leaves the precooler 102 via line 104 to the freezing, washing, and melting operation, while the octane warmed in the precooler 102 exits through line 105. The majority of the octane from the sea water precooler 102 is admitted to contactors 106 and 107 through lines 108 and 109. Sea water which has been precooled in the precooler 102 passes through line 104 to the freezer 110 where it is partially frozen in direct contact with cold liquid butene-1 which also enters through line 104. The freezing is accomplished by evaporation of the liquid refrigerant to form butene-1 vapors, which vapors are taken through line 111 to the primary compressor 112.

A slurry of ice and residual brine is removed from the freezer 110 and carried through line 113 to the washer-separator 114, with the aid of a pump, if required. In the washer-separator 114 ice is separated from the brine and simultaneously washed and heat-transferred with liquid octane. The liquid octane enters through line 115 and is sprayed over the top of the ice bed in the vessel 114. The octane washes occluded brine from the ice and melts a small portion of the ice, while bringing the remainder up to approximately 32° F. Brine and octane are removed from the vessel 114 through line 116, while the washed ice is removed through line 117 to the melter 118. To aid in moving the ice to the melter 118, it may first be slurried in product water. In the melter 118 the ice is completely melted with compressed refrigerant vapor from the compressor 112 which enters the melter through line 119. In melting, the compressed refrigerant is liquefied and product water and liquid refrigerant are removed from the vessel 118 through line 120. Compressed refrigerant vapor not needed to completely melt the ice may be conducted from line 119 through line 121 to the secondary compressor 122 and thence to the condenser 123 via line 124. Alternatively, the total output of the primary compressor 112 may be conducted through line 119 and the melter 118, and any uncondensed refrigerant may pass through line 125 to the secondary compressor 122, in which event line 121 is not needed. When part of the compressor output is fed directly to the secondary compressor 122, it is advisable to vent the melter 118 into line 111 and dispense with line 125. Condensed liquid refrigerant from the condenser 123 is taken through line 126 and combined with liquid butene-1 in line 127 for readmission to the freezer through line 104.

Product water and liquid butene-1 are removed from the melter 118 through line 120 to the separator 128. The liquid butene-1 is taken from the top of the separator 128 through line 127 for reuse in the freezer, while product water is removed via line 129 to the product water contactor 107 where it is heat-exchanged with octane from the precooler 102. Cold octane leaves the contactor 107 through line 115 for use in the washing step, while warm product water leaves the system through line 130 for storage, use, or further processing.

The octane-brine mixture leaving the washer 114 through line 116 is conducted to the separator 131. Octane is removed from the top of the separator 131 through line 103 for reuse in the precooler 102, while brine is removed through line 132 and admitted to the brine contactor 106. As noted above, warm octane from the precooler 102 enters the brine contactor 106 via lines 105 and 108 and is cooled in the brine contactor by direct contact countercurrent heat exchange with the residual brine. Cold octane leaves the brine contactor through line 133 and is mixed with the octane in line 103 for reuse in the precooler 102. Residual brine leaves the system for disposal, storage, use, or further processing through line 134.

By washing the ice in the washer 114 with liquid octane, the cold content in the ice is preserved and the ice is substantially freed of occluded brine by both the washing action of the octane and partial melting of the ice. In this way, the ice is also brought to approximately 32° F. prior to contact with compressed butene-1 vapor in the melter 118. A considerable savings in compressor load is accomplished in this fashion since the total heat required in the melter is only the heat of fusion of the ice, the ice having already been raised in temperature from the freezing point of 50 percent of the sea water to 32° F. The "cold" recovered from the ice is used to aid in the precooling of additional sea water. In order to adjust the amount of heat transfer and melting accomplished by the octane in the vessel 114, a connection may be provided between lines 105 and 115. This is illustrated by the dotted line 135 in FIG. 2.

Although not shown, it is sometimes advantageous to provide several additional devices in the system in order to operate the process effectively and economically. For example, the operation described is illustrative of the practice of this invention independent of start-up procedure. When initially freezing a solution such as sea water, refrigerant vapors are produced and compressed and must be cooled for reuse in the process before any ice is available for melting. Therefore, supplemental refrigeration is required upon start-up to re-cool the refrigerant vapors and to cool the entire system. This may be accomplished by an auxiliary propane refrigeration unit substituted during start-up for the melting vessel.

Even during operation some additional cooling may be necessary in the system. For example, in the operation illustrated by FIG. 2, the butene-1 liquid in line 127 may be cooled prior to reuse in the freezer. This may be accomplished by flash evaporating a portion of the refrigerant before it enters the freezer 110. Some butene-1 is evaporated to cool the refrigerant and then combined with butene-1 vapor in line 111 and recompressed. Similarly, the butane liquid flowing through line 38 in FIG. 1 may be partially flashed to the compressor to cool the remainder for use in the freezer 15.

In any vessel provided to condense gaseous refrigerant vapors, venting to a compressor stage may be desirable to prevent pressure build-up.

When treating sea water or other saline solutions by freezing to recover concentrated brine and relatively demineralized water, it is advantageous to pre-treat the incoming saline solution. For example, the saline may be freed of dissolved gases by vacuum deaeration. Although the process is not illustrated with a deaerator, inclusion of a deaerator is optional since dissolved air may be removed at a subsequent stage of the process. A deaerator has the advantage that partial pressure of air in the refrigerant vapor cycle may be somewhat reduced. Prior to the deaeration, or if deaeration is not employed, it is advantageous to blow air through the solution to displace carbon dioxide which may be dissolved in the water. As an alternate to blowing with air, carbon dioxide may be removed by adding lime to the saline water and removing any precipitate formed.

Provision must be made to vent any inert dissolved gases entering the system even when deaeration is employed. In addition to some provision for the removal of inert gases from the system, provision may also be made for recovery of refrigerant dissolved in the effluent products and for removal of various contaminants transferring between process streams. For example, refrigerant tends to dissolve in brine and water product streams and should be recovered from these streams. When a supplemental heat transfer fluid is employed, refrigerant tends to concentrate in the supplemental fluid which tends to strip dissolved refrigerant from the water. Inert gases entering the system tend to concentrate in the freezer-compressor-melter cycle and increase compressor energy requirements. These problems may be overcome by a process described in a patent application filed Mar. 23, 1961, by John W. Mohlman et al., entitled, Solution Purification Process (Serial No. 97,935, now U.S. Patent No. 3,183,679). In general, the process disclosed in the Mohlman et al. application consists of providing contactors for the product stream in which refrigerant is extracted into a high boiling liquid which is immiscible with water. A portion of the refrigerant employed in in the freezer-melter cycle is also absorbed into a portion of the immiscible liquid and the combined solution of refrigerant and immiscible liquid separated by stripping. Inert gases are vented from the system through absorption of the refrigerant from the freezer-melter cycle. The absorption-distillation sequence may be employed to provide a portion of the compressed refrigerant used in the melting step, and in some cases may be used as a substitute for mechanical compressors. Specifically, with reference to FIG. 1, a partial flash may be provided after the secondary compressor and the vapor resulting from this flash can be absorbed into a low vapor pressure liquid such as octane. The absorber is vented to allow inert gases to leave the system. Additionally, the product water flowing through line 44 and the residual brine in line 43 can be separately contacted with the octane to extract any dissolved butane. The combined octane from the extractors and absorber is then distilled to free it of butane which is returned to the system. With reference to FIG. 2, the output of the secondary compressor 122 may be partially condensed to collect any octane which has vaporized into the butane-1 stream. The liquid from this partial condensation is distilled to separate the butene-1 and octane. The remainder of the secondary compressor output in line 126, after total condensation in the condenser 123, may be subjected to a flash which will remove some of the butene-1 and dissolved inert gases. The vapor from this flash may be absorbed into the octane and then distilled along with the octane from the partial condensation. For this purpose a small amount of the octane flowing through line 105 may be diverted to line 136 to handle the absorber requirements. In this way, any butane dissolved in the octane streams is separated. The purified octane returns to the system through line 137 and recovered butane may be returned to line 127.

Ice may be transported between the various vessels in any desired fashion. It may be advantageous to slurry the ice in a stream of water of appropriate saline concentration. In order to maintain the desired fluidity, a portion of the residual brine may be recirculated to the freezer and transported along with freshly frozen slurry to the washer or separator. In the washer, separator, and melter stages water of appropriate salinity is also advantageously employed as a means of transporting the ice.

Since a small amount of refrigerant and heat transfer liquid may be constantly lost from the system, a provision should be made for a make-up stream. This may be done at any convenient point in the cycle, for example, octane may be added to line 105. Refrigerant may be admitted to the system at any convenient point, for example, to lines 127 and 38.

Refrigerants applicable to the present process include the lower aliphatic and olefinic hydrocarbons having boiling points below that of the solution to be purified. In addition, halogenated hydrocarbons and other vaporizable refrigerants may be employed. Examples of applicable refrigerants include the hydrocarbons having from 2 to 4 carbon atoms such as propane, butane, isobutane, butene-1, butene-2, isobutylene, methylchloride, and various fluorocarbons, as well as carbon dioxide, and the like. The refrigerant need not be a pure single refrigerant, but may be a mixture either blended to suit the needs of a paticular cycle, or an available mixture such as field butane or LPG. It is, of course, preferred that the refrigerant be relatively insoluble in the solution being treated. Thus, in a process for obtaining potable water from the sea water, the lower hydrocarbons and halogenated hydrocarbons are preferred.

The supplemental heat-transfer medium or absorber fluid employed in the process should be a relatively low vapor pressure inert liquid. For example, when processing sea water to produce fresh water, the heat-transfer medium may be a liquid higher aliphatic hydrocarbon which is a liquid in the operating temperature and pressure range (15–80° F.), such as hexane, heptane, octane, or commercially available mixtures of aliphatic, olefinic, naphthenic, and aromatic hydrocarbons derived from crude petroleum or coal tar. Kerosene and gasoline are examples of such petroleum-derived liquids suitable as heat-transfer mediums. In addition, other immiscible organic liquids such as vegetable "oils" may be employed.

To illustrate the application of this invention to a process for recovering approximately 250,000 gallons per day of potable water from sea water reference is again made to FIG. 2. In this example, octane is the immiscible heat transfer liquid and butane the refrigerant. Sea water enters the precooler 102 at approximately 3320 lb. per minute at 83° F. and is cooled to approximately 28.5° F. by 6318 lb. per minute of octane entering through line 103 at 26.1° F. The octane leaves at approximately 82° F. through line 105. The butane entering the freezer 110 is at approximately 23.2° F. About one-half the precooled saline is frozen. After removal to the washer, where it is washed with 3332 lb. per minute of octane at 36.6° F., ice leaves the washer at approximately 32° F. The residual brine and octane wash are taken from the washer through line 116 at about 25.7° F.

Approximately 1500 lb. per minute of butane vapor passes from the freezer through line 111 to the primary compressor 112 and is compressed to about 16.7 lb. per square inch absolute, thereby raising the temperature to approximately 44.5° F.

The octane warmed in precooling the sea water is recooled to about 27.1° F. in the brine contactor 106 and to about 33.8° F. in the product water contactor 107. A small portion of the warm octane from the precooler 102 and the total output from contactor 107 are used in the washer 114 and cold octane from the washer 114 is combined with cold octane from the brine contactor 106 to cool additional sea water.

Any gain in heat in the butane refrigerant is compensated by flashing a portion of the butane and the butane is returned to the freezer at the temperature indicated above.

The amounts of wash or heat transfer between ice and either the supplemental heat transfer fluid or refrigerant should be adjusted so that enough heat is supplied to the ice to raise the temperature of all the ice to 32° F., plus whatever amount of heat is required to melt the desired portion of the ice. When a lesser heat content than the minimum requirement is provided by the washing fluid it may cause the melting of a small amount of ice on initial contact, which melt will re-freeze as it moves through the ice bed toward lower and lower temperatures. In general, in order to purify the ice bed, it is advantageous to melt from 1 to 15 percent of the ice formed in the freezing step by washing with the immiscible heat transfer fluid. Preferably, however, from 2 to 10 percent of the initial ice formed is melted in the process of transferring heat from the immiscible heat transfer fluid prior to total melting. In cases of aqueous solutions having an extremely high saline content more than 15 percent of the initial ice may be melted as a wash in the heat transfer step.

Although the invention has been described and illustrated in detail, it is to be clearly understood that the same is by way of illustration and example only and is not to be taken by way of limitation, the spirit and scope of this invention being limited only by the terms of the appended claims.

We claim:

1. A process for separating relatively demineralized water from an aqueous solution which comprises (1) precooling said solution to substantially the freezing point in direct contact with a relatively cold immiscible heat-transfer fluid, thereby warming said fluid; (2) partially freezing said solution in direct contact with a vaporizable liquid refrigerant to form cool refrigerant vapors, ice and more concentrated residual solution; (3) separating said ice from said more concentrated residual solution, with the separated ice retaining occluded residual solution; (4) contacting the separated ice with said heat-transfer fluid to remove occluded residual solution and to warm said ice; (5) returning the removed occluded residual solution from step (4) to step (2); (6) compressing said refrigerant vapors; (7) melting said ice from step (4) in direct contact with said compressed refrigerant vapors to form water and cold liquid refrigerant; (8) recirculating said cold liquid refrigerant from step (7) to step (2), and (9) directly contacting said residual solution and said water separately with relatively warm immiscible heat-transfer fluid from step (1).

2. The process of claim 1, wherein said heat-transfer fluid is said refrigerant.

References Cited by the Examiner

UNITED STATES PATENTS 2,821,304  1/58  Zarchin _____ 62—58

FOREIGN PATENTS 70,507  6/46  Norway.

OTHER REFERENCES

Gilliland: "Fresh Water for the Future," Industrial and Engineering Chemistry, vol. 47, No. 12, December 1955, pp. 2410–2422.

NORMAN YUDKOFF, *Primary Examiner.*

ROBERT A. O'LEARY, *Examiner.*